US008506140B2

(12) United States Patent
Edmisten

(10) Patent No.: US 8,506,140 B2
(45) Date of Patent: Aug. 13, 2013

(54) SKI OR SNOWBOARD MOUNTABLE LIGHT-EMITTING SAFETY DEVICE

(76) Inventor: Roland Edmisten, Three Rivers, MI (US)

( * ) Notice: Subject to any disclaimer, the term of this patent is extended or adjusted under 35 U.S.C. 154(b) by 0 days.

(21) Appl. No.: 13/457,569

(22) Filed: Apr. 27, 2012

(65) Prior Publication Data

US 2012/0275177 A1 Nov. 1, 2012

Related U.S. Application Data

(60) Provisional application No. 61/480,153, filed on Apr. 28, 2011.

(51) Int. Cl.
*B60Q 1/00* (2006.01)

(52) U.S. Cl.
USPC ...... 362/486; 362/545; 362/249.05; 362/234; 280/87.042; 280/816

(58) Field of Classification Search
USPC .................... 362/459, 486, 543–545, 249.02, 362/234, 253; 280/87.042
See application file for complete search history.

(56) References Cited

U.S. PATENT DOCUMENTS

| | | | | |
|---|---|---|---|---|
| 4,279,433 | A | 7/1981 | Petaia | |
| 4,997,196 | A * | 3/1991 | Wood | 280/87.042 |
| 6,802,636 | B1 | 10/2004 | Bailey, Jr. | |
| 7,708,289 | B2 | 5/2010 | Jaime, Sr. | |
| 2004/0212980 | A1 | 10/2004 | Wells | |
| 2004/0257831 | A1 * | 12/2004 | Liao | 362/565 |
| 2008/0150255 | A1 | 6/2008 | Hogenmiller et al. | |

* cited by examiner

*Primary Examiner* — Thomas Sember
(74) *Attorney, Agent, or Firm* — Daniel Boudwin

(57) ABSTRACT

A safety illumination device that is mountable to an edge of a ski or snowboard is provided. The device has a curved exterior housing with a front window panel along the convex front portion, an upper window panel along the top and a concave cutout along the rear portion. A circuit board containing control circuitry, a power source and two arrays of lights is housed within the exterior housing. When the device is turned on, light is emitted through the window panels. This assists persons uphill and downhill from the user to see the user in the dark. Selection of an illumination pattern is controlled by a magnetic wand that the user waves over the upper surface of the device. Users may thus easily operate the device and customize their lighting experience. The device is secured to a ski or snowboard via the concave cutout and a pair of screws.

20 Claims, 4 Drawing Sheets

SKI OR SNOWBOARD MOUNTABLE LIGHT-EMITTING SAFETY DEVICE

CROSS REFERENCE TO RELATED APPLICATION

This application claims the benefit of U.S. Provisional Application No. 61/480,153 filed on Apr. 28, 2011, entitled "Snow Strobes."

BACKGROUND OF THE INVENTION

1. Field of the Invention

The present invention relates to a safety illumination device that can be mounted to the edge of a ski or snowboard. It provides a variety of illumination effects so that users have a number of colorful and attractive options of safety lighting when on a ski slope at night.

In recent years, many ski resorts have begun to offer nighttime skiing hours. Resorts place lighting along the side of selected ski runs to provide illumination during evening hours so that nighttime patrons can safely engage in the activities they enjoy. Unfortunately this illumination is not always sufficient to cover the width of a run, and illumination is often more spaced out at higher parts of the slope. Due to insufficient lighting, there are often dark areas on the ski slope where users may be unable to see the terrain. Shadowy regions on a run are a safety hazard because it is difficult for skiers and snowboarders to see objects or people within the shadowy area. Poor visibility increases the likelihood that patrons will collide with each other or obscured objects in the terrain. A solution is needed that provides safety illumination capable of alerting persons uphill and downhill from a user to the user's presence, as well as providing the user with illumination of the surrounding terrain.

2. Description of the Prior Art

The prior art devices fail to provide structure that allows the flexible placement and function of the present invention. The present invention provides a light-emitting device mountable to a snowboard, skiboard or individual skis. The emitted light radially illuminates an area directly in front of the device to provide a snowboarder or skier with improved visibility of immediate terrain. A small magnetic wand is used as a control device and facilitates toggling of emitted color patterns and blinking. The device thus provides improved safety while snowboarding or skiing in poor visibility conditions and has the added benefit of a number of visually entertaining light effects. Though the prior art discloses a handful of light-emitting devices for snow and board sports, none of these devices is removably mounted to any portion of the nose or tail of a snowboard or ski.

Illuminating devices are sometimes secured to the binding of a ski or snowboard to provide lighting in the area around the user's boots. Hogenmiller, et al, U.S. Patent Application Publication No. 2008/0150255 discloses one such device that removably secures to the binding of a ski. The illuminating device consists of a series of ultrabright LEDs (or like light source) coupled to a removable power source such as a 9.0 volt battery. Holes are drilled along the sides of the binding bottom to receive the LEDs. The lights are then held in place by hook and loop fasteners, tape or other adhesive. Individual lights can be removed and replaced with lights of another color to permit users to customize the color of the glow. Unlike Hogenmiller, the present invention does not require permanent modification to any part of a snowboard or ski. Indeed, it provides a soft water resistant foam or rubber mat that is inserted between screwing means and a snowboard or ski to protect the user's equipment from damage. Many winter sports enthusiasts are particular about their equipment set-up and would be highly reluctant to permanently modify their bindings. With the present invention, users do not have to make these modifications to experience highly customizable illumination.

Wells, U.S. Patent Application Publication No. 2004/0212980 discloses a riser for a snowboard or skateboard that provides illumination to the feet area. The riser is made of a translucent acrylic and contains a plurality of LEDs and a power source. On a snowboard the riser is a plate that a snowboard binding sits on. The binding is attached to the snowboard through the riser. When the device is turned on, via an on/off toggle switch, light is emitted from underneath the binding, lighting up the area around the feet. Many snowboarders do not like to use risers because it lifts the feet away from the board creating a feeling of being disconnected from the board. Minor adjustments to toe and heel pressure cause riders to veer to one side or another, making it important to have a solid connection between the feet and the board. Thus many riders feel that the feeling of "disconnectedness" experience during use of risers, results in a poor snowboarding experience. The present invention does not require users to make any changes to their fundamental snowboard or ski set-up.

Other illumination devices provide light to general areas along the sides or top of a snowboard or ski. Jaime Sr. U.S. Pat. No. 7,708,289 discloses a device for skateboards or snowboards having parallel bands of lighting attached to laterally opposing sides of the board. The band is a translucent tube containing lights and a battery source. When the device is in use it provides colorful, customizable illumination color patterns. Neither Hogenmiller, Wells nor Jaime Sr. disclose lighting that removably secures to the front of a snowboard or ski. These devices illuminate the area around the user's feet but not the area directly in front of the snowboard or ski. The present invention can be removably secured to any portion of a user's board, but the preferred placement is on the nose/tip of the equipment. It has a curved recess designed to receive the nose or tail of a snowboard and can be secured without damage to the equipment.

Another type of lighting device is taught by Petaia, U.S. Pat. No. 4,279,433, which discloses a device for assisting in the locating of equipment lost in the snow. When a skier or snowboarder falls, the equipment can disconnect from the person's feet and fall down the slope. Equipment is easily lost in deep snow or poor visibility conditions. Petaia addresses this problem by providing a device that attaches directly to a ski or snowboard and emits light or noise if the equipment disconnects from the user's feet. The device remains inactive so long as the equipment is in use, but will active with sound or strobing light when equipment is separated from the user. This device assists users with locating skis or snowboards lost in the snow, but it is not helpful for providing illumination while the equipment is in use. The present invention provides a device that can be activated or deactivated by the user at any time. Further, the Petaia device requires modification of the user's skis or snowboard, while the present invention is removably securable without permanent modification.

These prior art devices have several known drawbacks. They do not illuminate the snow directly in front of the user's skis or snowboard. Many of the devices are limited to use in a particular area, such as the user's feet or the sides of a snowboard. The present invention does not suffer this drawback because it can be removably secured to any portion of the edge of a ski or snowboard. This allows the user to direct emitted light according to his or her preference. Additionally, several of them require permanent modification of the user's equipment. The present invention provides a soft, water-resistant pad to be placed between attachment means and the user's equipment to prevent damage to the surface or structural integrity of the ski or snowboard. Lastly, none of the aforementioned prior art devices provide a magnetic wand that controls light patterns and color selections, allowing a user to control device settings without removing equipment from his or her feet and fumbling with the device. It substantially diverges in design elements from the prior art and consequently it is clear that there is a need in the art for an improvement to existing ski and snowboard illumination devices. In this regard the instant invention substantially fulfills these needs.

SUMMARY OF THE INVENTION

In view of the foregoing disadvantages inherent in the known types of ski and snowboard mountable illumination devices now present in the prior art, the present invention provides a new remote control capability and removable securement to any location along the edge of a ski or snowboard, wherein the same can be utilized for providing convenience for the user when skiing or riding a snowboard in the dark or low vision conditions.

The present invention provides a highly customizable light source to nighttime winter sports enthusiasts. It can be used for both novelty and safety purposes. The device housing contains circuitry for controlling and powering two arrays of light-emitting diodes (LEDs) or other high intensity, low energy consumption lights. A translucent, impact-resistant window comprises a window on the upper and front portions of the housing to display the lights within. The arrays will be positioned at separate angles so that the first array emits light in a vertical direction. While the second array emits light at angle between 0 and 180 degrees from the vertical. This dual positioning is important for safety because the vertically directed lights will assist persons farther up the slope to see the user; and the angled lights will assist the user in seeing the terrain immediately in front of her, as well as making the user visible to persons downhill.

The rear of the housing has a concave cutout shaped to fit the curvature of a ski tip or snowboard nose/tail. Attachment screws extend downward through the upper portion of the housing and down into the cutout to facilitate securement of the device to a user's equipment. The user can position the device anywhere along the ski tip or snowboard nose/tail and secure the device in place using the screws. This easily adjustable placement of the device is essential because all skiers and snowboarders have different styles of practicing their sport and thus will have different needs with respect to where the device should be placed to best illuminate surrounding terrain. To prevent damage to a user's equipment a soft but resilient pad insert is included. The pad is placed between ends of the screws and the upper surface of a user's ski or snowboard. Padding the securement area substantially reduces the risk that a user will damage the underlying ski or snowboard when tightening screws or when the device and equipment are jostled during ground collisions.

To further increase safety, the present invention provides remote control capability. Users do not have to remove their skis or snowboard and stand on the side of a ski slope in the dark in order to turn the device on on/off or control settings. Device power flow and light patterns are manipulated by magnetic input. Waving a magnet in proximity to the top of the housing will turn the device on. Each subsequent wave will cycle through one of the device's preset illumination patterns. The cycle terminates with an off signal, shutting the device down. A small magnetic wand is included with the device but any magnet may be used to control the device, in the event that the wand is lost. Remote control capabilities increase safety because a user can quickly "pull over' to the side of a ski slope, grab the magnetic wand and wave it over the device as needed, then pocket the wand and continue on down the slope. The less time that a user is stationery and pre-occupied on the side of the ski slope, the less likely that someone coming down the run will hit them.

Lights installed in the device will vary in color. Several different colors of light are secured within the housing. Lights can be illuminated in a variety of configurations and may even blink or strobe. Users can select the desired combination of colors or a light effect by waving the magnetic wand across the top of the device until the desired illumination pattern appears. Some illumination patterns will be useful for safety purposes and other are primarily for novelty use. The present invention thus provides a device that is used for customizable safety and novelty lighting for skiers and snowboarders.

It is therefore an object of the present invention to provide a new and improved ski or snowboard mountable illumination device that has all of the advantages of the prior art and none of the disadvantages.

It is therefore an object of the present invention to provide an illumination device that can be mounted to any portion of the outside edge of a ski or snowboard, thereby assisting users with directing illumination in a manner that is consistent with the user's style of practicing their sport.

Another object of the present invention is to provide an illumination device that emits light in both and upward and forward direction. This multiple direction emission improves the visibility of the user to both persons uphill and downhill from the user.

Yet another object of the present invention is to provide an illumination device that is operable via a handheld magnet; enabling a user to manipulate device power and settings without disengaging the equipment. Reduction in the complexity of using the device on a ski slope will decrease the risk of on-slope collisions.

Still another object of the present invention is to provide an illumination device that can me tightly, removably secured to a ski or snowboard without damaging the equipment or requiring permanent modification.

A further object of the present invention is to provide an illumination device that offers a variety of color effects and illumination patterns to users. Some effects will be particularly useful for safety purposes and others will be novel and entertaining.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

Figure 5:
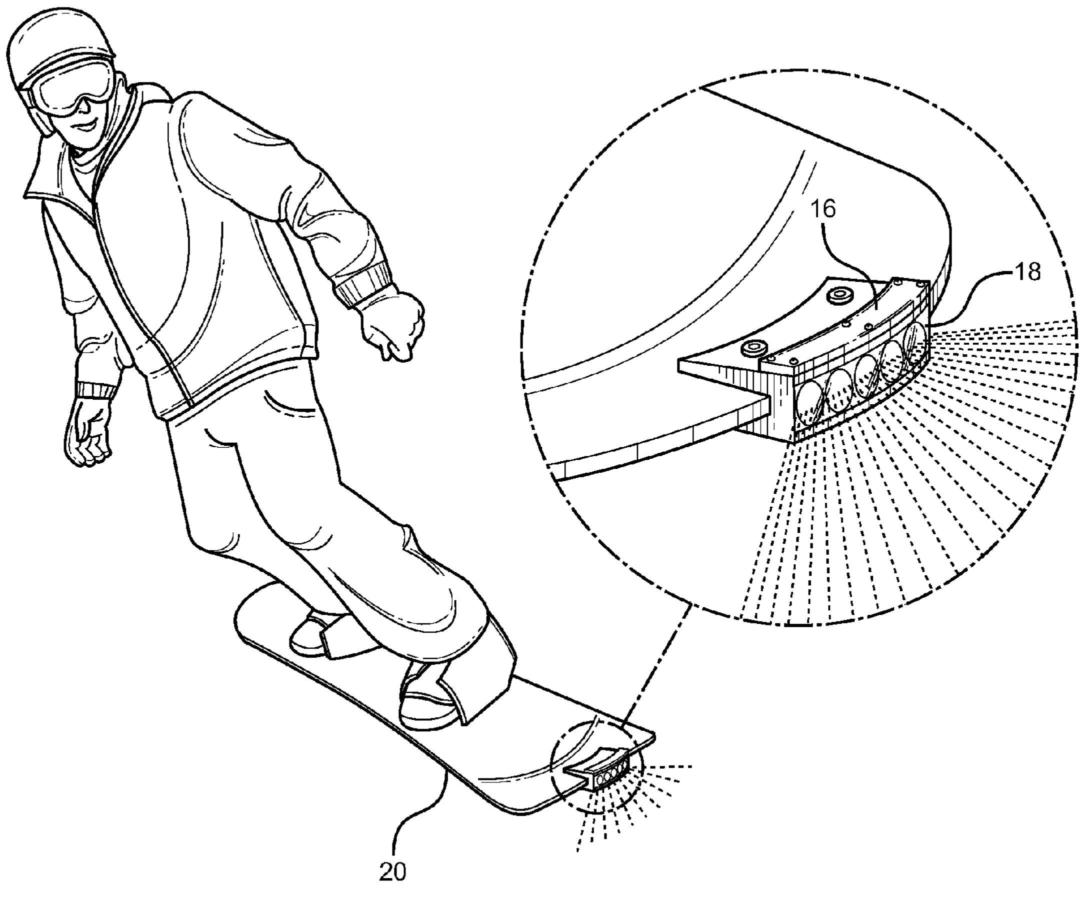

FIG. 5 shows the device in use with a snowboard, while the user is riding the snowboard. A magnified view is show of the present invention secured to the nose of the snowboard. Forward facing light is emitted through the front window panel, illuminating the area in front of the snowboard.

Figure 6:
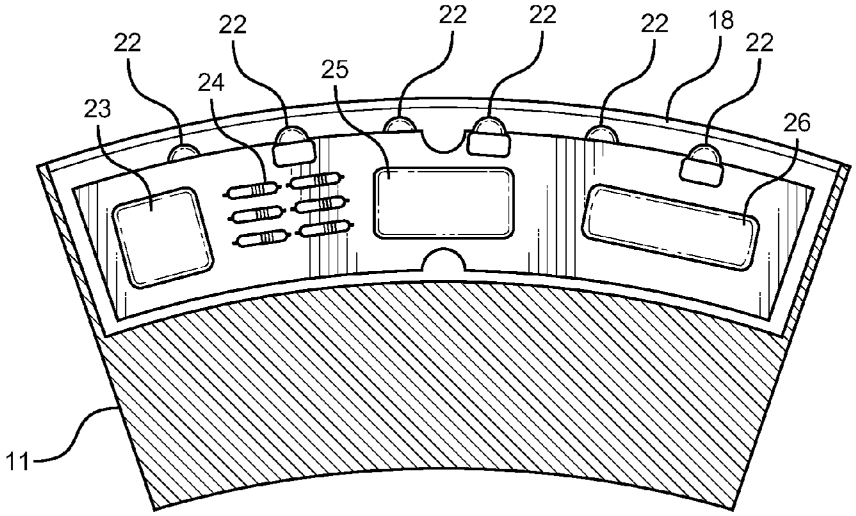

FIG. 6 shows an exemplary embodiment of the interior circuitry of the device.

FIGS. 7 A-C, show exemplary embodiments of the magnetic wand of the present invention.

DETAILED DESCRIPTION OF THE INVENTION

Reference is made herein to the attached drawings. Like reference numerals are used throughout the drawings to depict like or similar elements of the ski or snowboard mountable illumination device. For the purposes of presenting a brief and clear description of the present invention, the preferred embodiment will be discussed as used for providing nighttime or low-light illumination on snow covered surfaces. The figures are intended for representative purposes only and should not be considered to be limiting in any respect.

Figure 1:
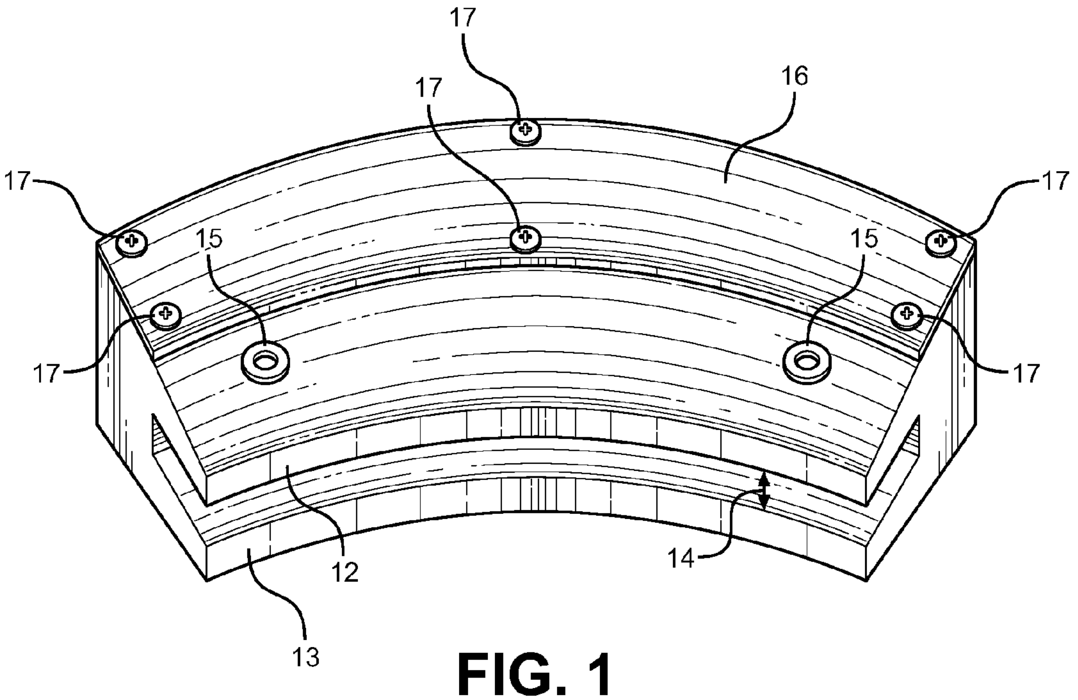
FIG. 1 shows an overhead perspective view of the present invention. The upper window panel is seen secured to the housing and the securement screws are in a tightened position.

Referring now to FIG. 1, there is shown an overhead view of the illumination device. An exterior housing 11 forms the main body of the device. It has a curved shape with a front face that may be convex, flat, or sloped, and a concave rear portion that is divided into an upper rear face 12 and lower rear face 13 with a concave cutout 14 lying therebetween. A ski tip or snowboard end is slid into the concave cutout and removably secured into place by a pair of securing screws 15. The concavity of the cutout is designed to conform to the curvature of a tip or snowboard edge and thus will differ in individual device models. The closer the curvature of the concave cutout to that of the area of attachment on a ski or snowboard, the more snuggly the device will be secured. A secure attachment connection is highly desirable because skiing and snowboarding can be high-impact sports where extreme jostling is experienced. Devices that are not well secured to the underlying equipment may be jostled loose or slip out of position.

An interior cavity (not shown) positioned near the front of the exterior housing securely retains the lighting assembly (not shown). To allow viewing of illumination generated by the lighting assembly, a translucent impact-resistant upper window panel 16 is secured over the interior cavity. This upper window is removable to give users access to the lighting assembly so that they may change out batteries and lights. A set of small screws 17 secures the upper window panel to the exterior housing. These screws can be unfastened when a user intends to remove the upper window panel, but should remain firmly in place while the device is in use to prevent snow and debris from getting inside the interior cavity where it can damage the lighting assembly.

Figure 2:
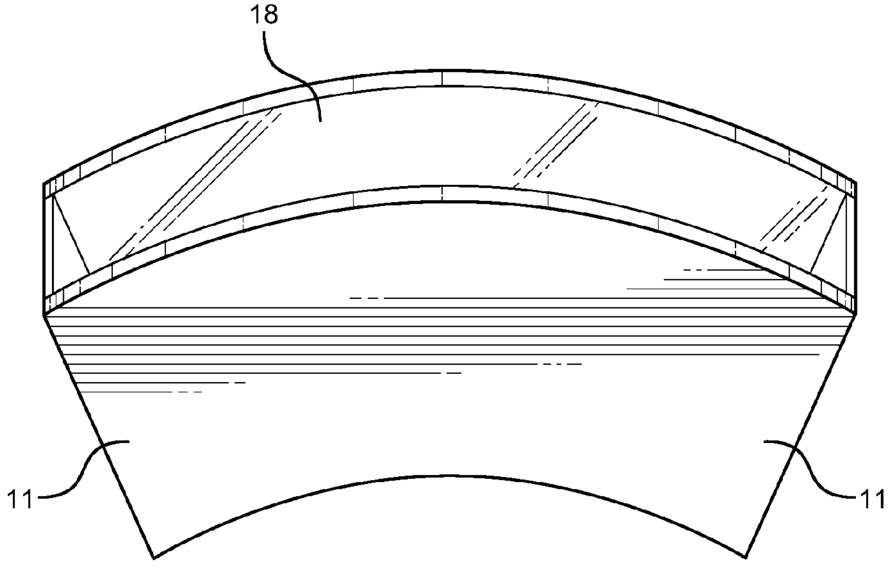
FIG. 2 shows an underside perspective view of the present invention. The front window panel extends across the front surface of the device.

Referring now to FIG. 2, there is shown an underside view of the present invention. The front face of the device is comprised of a front window panel 18 extending between laterally opposing sides of the exterior housing. The panel is constructed of a translucent impact-resistant material to permit light generated by the lighting assembly to shine through the window. Unlike the upper window panel (see FIG. 1) the front window panel is not removable. The front window panel has a watertight seal with the exterior housing to prevent snow and debris from entering the interior cavity.

Figure 3:
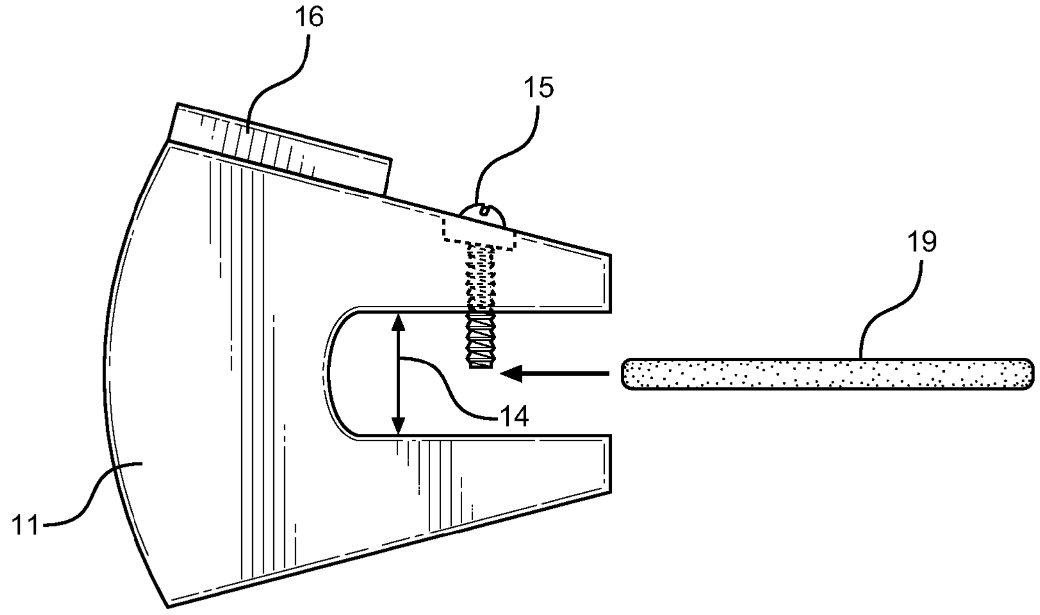
FIG. 3 shows a side view of the present invention. The padding insert is shown and can be inserted into the concave cutout to act as a protective barrier between a user's equipment and the securement screws.

A side view of the illumination device is shown in FIG. 3. The upper window panel 16 is secured to the upper portion of the exterior housing 11 to protect the lighting assembly. Securing screws 15 extend downward through threaded holes in the upper portion. The screws extend into the concave cutout 14 to provide removable securement of the device to a ski or snowboard. When the edge snowboard or ski is inserted into the concave cutout, the screws are tightened, creating pressure sufficient to hold the device in place. Over time this pressure can cause damage to a user's equipment. Additionally, the jostling experienced from repeated minor ground collisions could increase the damage done to the equipment by jarring the attachment area. To address the potential for equipment damage, the current invention provides a thin protective pad 19 that is placed over the upper surface of the equipment before securing the device in place. The pad is constructed of a waterproof or water-resistant material that is shock-absorbent such as a foam rubber or flexible plastic. When the device is secured to a ski or snowboard with the protective pad in place between the equipment and the securing screws, the pad will absorb minor shocks and pressure. The protective pad thus protects a user's equipment from being damaged by the securement means. Though the curved shape of the device is well-suited to the tip of a ski or nose/tail of a snowboard, it should be understood that the device may be easily secured to any area along the edge of such equipment and is not limited to placement along end areas.

Figure 4:
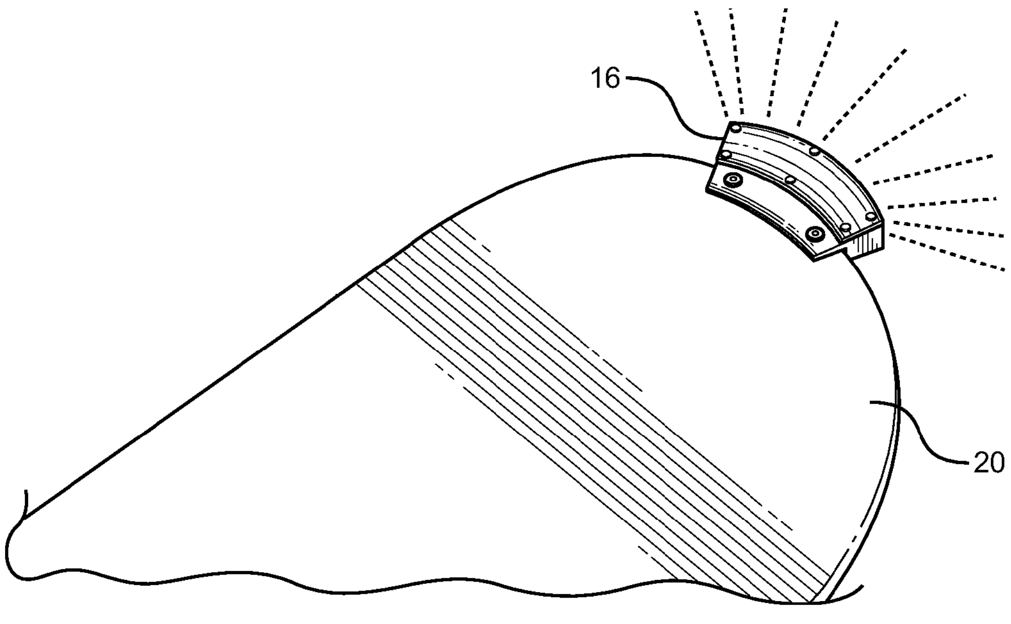
FIG. 4 shows an overhead perspective view of the device in use with a snowboard. Vertically directed light is emitted through the upper window panel on the top of the device.

Turning now to FIG. 4 there is shown a perspective view of the present invention secured to an end of a snowboard 20. Light is emitted through the upper window panel 16 in a vertical direction. Directing part of the emitted light upward is important because it assists persons uphill from the user to see that another person is on the slope. Persons uphill from the user are generally behind the user and consequently the user is unable to avoid them. But if the uphill skier or snowboarder sees the device lights, they can avoid the user.

Similar in nature to the upper window panel's safety advantages, the front window panel 18 shown in FIG. 5, also provides notice of the user's presence on the slope. Light shining through the front window panel is directed forward to illuminate terrain in front of the user's snowboard or skis. Rocks and branches hidden under the snow will be visible due to the illumination and can be avoided by users. Uneven terrain and general environmental hazards will be illuminated, helping users to move away from dangerous areas. In addition to increasing the safety of a user in a given area of terrain, the front window panel illumination will be visible to persons downhill from the user. Thus, persons standing on the side of the slope will be aware that the user is coming down the slope and can move if necessary. In this way, both the upper window panel and lower window panel increase overall ski slope safety by making the user visible to persons positioned uphill or downhill from the user.

Turning now to FIG. 6, an exemplary embodiment of the lighting assembly is shown, positioned within the exterior housing 11. A cavity is downward from the upper portion of the housing and along the front. Control circuitry for the lights 22 is secured within this interior cavity. In an exemplary embodiment the control circuitry contains at least an integrated circuit (I/C) chip 23, a grouping of resistors 24, a magnetic switch 25, a battery cell 26 and two arrays of LED lights 22. Power supplied by the battery cell is toggled on and off by the magnetic switch. When power flows through the control circuitry, the LED light arrays are illuminated according to preset patterns within the IC chip. A preset cycle of illumination patterns is programmed into the IC chip to give users a variety of options in choosing their illumination pattern. Triggering the magnetic switch causes the LEDs to cycle through illumination patterns. For example, The first setting is “all on” and is activated when the device is turned on, the next setting may be a color pattern of green and white, followed by blue and white, and so on. After the last illumination pattern is reached, subsequent triggers of the magnetic switch will turn the device off. It should be understood that the described control circuitry is for exemplary purposes only and is not intended to limit the construction of the device to this specific electrical configuration. Magnetically triggered electric circuits are known in the art or circuitry and one or ordinary skill in the art would be able to adapt other configurations of circuitry to control a pre-set cycle of LED illumination patterns.

Two arrays of LEDs 22 are positioned along the circuit board. A first array is secured to the upper surface of the circuit board to provide illumination in a vertical direction. When the device is on, these lights can be seen through the upper window panel. A second array of lights is positioned along the front edge or on the bottom of the circuit board. The second array may be angled at any desired angle degree between 0 and 180 from the vertical axis, but should be directed forward. When then device is powered on, the second array of lights shines through the front window panel, illuminating the terrain in front of a user. Manufacturers may place the second array at a variety of angles to accommodate the illumination needs of different users. A standard model will have a second array of lights directed 90-110 degrees from the vertical axis, to direct light forward and downward slightly.

The lights, preferably LEDs, can be configured with a variety of color options and patterns. LED lights are available in a wide variety of colors and thus many combinations may be used in the device. Some models of the device will include lights of the same color so that users can match the illumination to the color scheme of their equipment. Other models will contain lights of different colors, and will contain a variety of preset illumination patterns with different color combinations. All embodiments will offer several blink patterns such as strobing, slow blink, rotational blinking (each light blinks in turn), combination blinking, and all lights solid. Users are thereby provided with many fun and aesthetically pleasing options for safety illumination while on the ski slope at night.

Figure 7A:
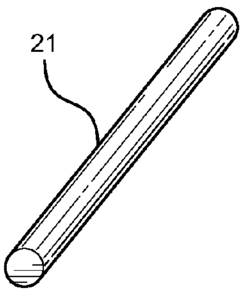
Figure 7B:
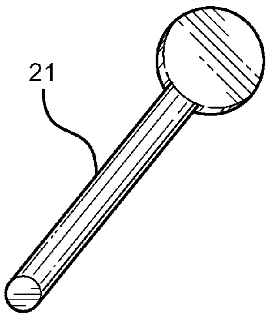
Figure 7C:
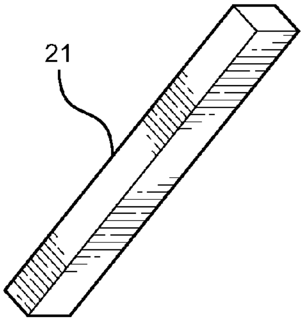

Illumination of the lights is controlled by the magnetic switch. Most magnets can be used to trigger the magnetic switch, but the present invention includes a magnetic wand. In FIG. 7 several embodiments of magnetic wand are shown. The wand may be entirely magnetic material as in FIGS. 7A & 7C or alternatively may be composed of another substance with a magnet attached thereto, as in FIG. 7B. To trigger the magnetic switch and advance the illumination pattern cycle the user waves the magnet over the upper surface of the device. Each pass of the magnet over the device will advance the illumination cycle. In one embodiment the wand may be a small hand-held magnet that can be placed in a user’s coat or pants pocket. In another embodiment the magnet is adapted for placement with a storage pocket on a user’s gloves. In the second embodiment the user need only wave his or her hand over the device to trigger it. This reduces the risk that a user will drop the magnet in the snow while operating the device. The magnetic wand provides an easy and hassle-free way for users to control the illumination device without having to remove equipment or their gloves. Devices that necessitate removal of equipment and gear cause a user to stop for lengthy periods on the side of a ski slope, where the user is at risk for collisions with other skiers and snowboarders coming down the hill.

In use an individual slides the concave cutout region of the device over the desired attachment area on a ski or snowboard. The user then slides the protective pad onto the upper surface of the ski or snowboard that is within the concave cutout. Securing screws are then fastened tightly so that they exert pressure on the protective pad and consequently on the ski or snowboard. The user can test the sufficiency of securement by attempting to move the device back and forth laterally. If the device does not move then it is sufficiently secured to withstand regular jostling. When the user is ready to turn the illumination effects on, he or she waves the magnetic wand over the upper surface of the device. The user continues to wave the wand over the device until the desired illumination pattern is reached. The device is ready for use and user can ski or snowboard as normal, with increased safety and environmental awareness.

The present invention provides a safety illumination device that may be mounted to the edge of a ski or snowboard. The device is removably secured to such equipment through the use of securing screws and a shock-absorbent protective pad. When the device is powered on, colored LED lights shine at different angles to provide notice to persons uphill and downhill from the user with visual notice of the user’s presence. The device also provides fun and entertaining illumination of the terrain near a user, thereby increasing the user’s situational awareness.

Various materials may be used in the construction of the exterior housing, but waterproof, shock-absorbent or resistant materials are recommended. In a preferred embodiment an injection molded polycarbonate is used to make the device. The entire device may be made of translucent polycarbonate to allow a maximum amount of light to shine through. Alternatively the exterior housing may be a solid colored material and the window panels will be the only translucent portions. To give users additional customization options, the device will come with a variety of decals that can be adhered to the surfaces of the exterior housing. These decals assist users with customizing the look and feel of the illumination device so that it fits with the color scheme of their other equipment.

To this point, the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A safety illumination device mountable to an edge of a ski or snowboard, comprising:

a housing having an upper portion, a lower portion, a front portion, a rear portion, wherein said rear portion has a concave cutout disposed therein that receives and engages the edge of a ski or snowboard;

an equipment securement means adapted to removably secure said ski or snowboard engagement;

a circuit board having control circuitry and a power source, secured within said housing;

a plurality of lights secured to said circuit board and electrically connected thereto;

wherein said lights shine through said upper and front portion when said light sources are illuminated.

2. The device of claim 1, wherein said circuit board contains a magnetic switch that is secured to said circuit board and is electrically connected to said control circuitry and said power source, wherein said magnetic switch activates and deactivates said power source.

3. The device of claim 2, further comprising a magnetic wand that interacts with said magnetic switch to operate said switch without physical input from a user.

4. The device of claim 1, wherein said plurality of lights comprises a first array of lights and a second array of lights.

5. The device of claim 4, wherein said first array of lights is secured to said circuit board such that light is directed to shine through said upper portion when said first array of lights is illuminated.

6. The device of claim 4, wherein said second array of lights is secured to said circuit board such that light is directed to shine through said portion when said second array of lights is illuminated.

7. The device of claim 1, wherein said front portion has a convex shape.

8. The device of claim 1, wherein said control circuitry contains a preset cycle of illumination patterns for said plurality of lights.

9. The device of claim 1, wherein said securement means comprises a pair of screws extending downward through said housing upper portion into said concave cutout to engage a ski or snowboard.

10. The device of claim 1, wherein said upper portion and said front portion of said housing are translucent panels that allow light to shine therethrough.

11. The device of claim 1, further comprising:

a protective pad, placed by a user, between said equipment securement means and said ski or snowboard.

12. A safety illumination device mountable to an edge of a ski or snowboard, comprising:

a housing having an upper portion, a lower portion, a front portion, a rear portion, wherein said rear portion has a concave cutout disposed therein that receives and engages the edge of a ski or snowboard;

an equipment securement means adapted to removably secure said ski or snowboard engagement;

a circuit board having control circuitry and a power source, secured within said housing, a magnetic switch that is secured to said circuit board and is electrically connected to said control circuitry and said power source, wherein said magnetic switch activates and deactivates said power source;

a plurality of lights secured to said circuit board and electrically connected thereto;

wherein said lights shine through said upper and front portion when said light sources are illuminated.

13. The device of claim 12, further comprising a magnetic wand that interacts with said magnetic switch to operate said switch without physical input from a user.

14. The device of claim 12, wherein said plurality of lights comprises a first array of lights and a second array of lights.

15. The device of claim 14, wherein said first array of lights is secured to said circuit board such that light is directed to shine through said upper portion when said first array of lights is illuminated.

16. The device of claim 14, wherein said second array of lights is secured to said circuit board such that light is directed to shine through said front portion when said second array of lights is illuminated.

17. The device of claim 12, wherein said front portion has a convex shape.

18. The device of claim 12, wherein said control circuitry contains a preset cycle of illumination patterns for said plurality of lights.

19. The device of claim 12, wherein said securement means comprises a pair of screws extending downward through said housing upper portion into said concave cutout to engage a ski or snowboard.

20. The device of claim 12, wherein said upper portion and said front portion of said housing are translucent panels that allow light to shine therethrough.

* * * * *